(12) United States Patent
Kroepfl et al.

(10) Patent No.: US 7,974,314 B2
(45) Date of Patent: Jul. 5, 2011

(54) SYNCHRONIZATION OF MULTIPLE DATA SOURCE TO A COMMON TIME BASE

(75) Inventors: Michael Kroepfl, Redmond, WA (US); Gerhard Neuhold, Naas (AT); Stefan Bernögger, Graz (AT); Martin Josef Ponticelli, Graz (AT); Joachim Pehserl, Graz (AT); Gur Kimchi, Bellevue, WA (US); John Charles Curlander, Boulder, CO (US)

(73) Assignee: Microsoft Corporation, Redmond, WA (US)

( * ) Notice: Subject to any disclaimer, the term of this patent is extended or adjusted under 35 U.S.C. 154(b) by 183 days.

(21) Appl. No.: 12/354,793

(22) Filed: Jan. 16, 2009

(65) Prior Publication Data

US 2010/0183034 A1 Jul. 22, 2010

(51) Int. Cl.
H04J 3/06 (2006.01)
(52) U.S. Cl. ......................... 370/503; 375/356
(58) Field of Classification Search .................. 375/356, 375/371, 373, 376; 370/395.62, 503–509
See application file for complete search history.

(56) References Cited

U.S. PATENT DOCUMENTS

| | | | | |
|---|---|---|---|---|
| 5,550,754 | A * | 8/1996 | McNelley et al. | 348/14.01 |
| 6,686,970 | B1 * | 2/2004 | Windle | 348/584 |
| 6,825,875 | B1 * | 11/2004 | Strub et al. | 348/207.99 |
| 6,973,090 | B2 | 12/2005 | Ofek et al. | |
| 7,079,554 | B2 | 7/2006 | Peled | |
| 7,263,379 | B1 * | 8/2007 | Parkulo et al. | 455/521 |
| 7,343,255 | B2 | 3/2008 | Osterloh et al. | |
| 7,382,780 | B1 | 6/2008 | Moretti et al. | |
| 7,664,057 | B1 * | 2/2010 | Wu et al. | 370/260 |
| 2003/0231238 | A1 * | 12/2003 | Chew et al. | 348/14.02 |
| 2004/0001144 | A1 * | 1/2004 | McCharles et al. | 348/207.99 |
| 2004/0170383 | A1 * | 9/2004 | Mazur | 386/68 |
| 2005/0276282 | A1 * | 12/2005 | Wells et al. | 370/503 |
| 2007/0247292 | A1 | 10/2007 | Joung et al. | |
| 2008/0160977 | A1 * | 7/2008 | Ahmaniemi et al. | 455/416 |
| 2010/0177791 | A1 * | 7/2010 | Turner et al. | 370/509 |

OTHER PUBLICATIONS

Kol, et al., "Adaptive Synchronization for Multi-Synchronous Systems", retrieved at <<http://www.ee.technion.ac.il/~ran/papers/KolGinosarAdaptSyncICCD1998.pdf>>, pp. 1-12.

Riegel, et al., "Time-based Transactional Memory with Scalable Time Bases", retrieved at <<http://wwwse.inf.tu-dresden.de/papers/preprint-riegel2007Isart.pdf>>, ACM, pp. 9.

Lamont, et al., "Synchronization of Multimedia Data for a Multimedia News-On-demand Application", retrieved at <<http://citeseer.ist.psu.edu/cache/papers/cs/832/http:zSzzSzwww.mcrlab.uottawa.cazSzpaperszSzJSAC.96-Georganas.pdf/lamont96synchronization.pdf>>, pp. 25.

Diduch, et al., "Synchronization of Data Streams in Distributed Realtime Multimodal Signal Processing Environments Using Commodity Hardware", retrieved at <<http://www.nist.gov/smartspace/downloads/ICME08_paper.pdf>>, pp. 4.

Michel, "Synchronizing Multimodal Data Streams Acquired Using Commodity Hardware\", retrieved at <<http://www.nist.gov/speech/tests/rt/2009/docs/vssn01-michel.pdf>>, pp. 6.

* cited by examiner

Primary Examiner — Huy D Vu
Assistant Examiner — Benjamin Lamont

(57) ABSTRACT

Systems and methods are described herein that cause data from asynchronous data sources to be provided with a timestamp that corresponds to a common time base. A trigger board can be used to control synchronized data sources, and can generate timestamps when data is collected by the synchronized data sources. Unsynchronized data sources can generate data independent of the trigger board. System timestamps are generated each time data from the synchronized data source and the unsynchronized data source is received. Values of the system timestamp can be modified, and can be replaced by timestamps that correspond to the time base used by the trigger board.

20 Claims, 11 Drawing Sheets

SYNCHRONIZATION OF MULTIPLE DATA SOURCE TO A COMMON TIME BASE

BACKGROUND

Sensors are used in a plurality of different types of systems in connection with operating a system and/or collecting data and/or correlating data. For instance, in an industrial automation environment, sensors are often used to sense particular conditions and a device or system is operated responsive to the sensor sensing the condition. In another example, in a system configured to detect or predict weather conditions, sensed air pressure measurements may be desirably correlated with wind speed measurements and temperature measurements captured at particular points in time. Thus, in certain systems or environments, it may be desirable to correlate various sensed values with respect to time.

Oftentimes, however, sensors are equipped with their own internal clock mechanism and are not conducive to operate in connection with a central timing device. For relatively inexpensive sensors, these internal clocks may be somewhat imprecise. For instance, two sensors may be configured to operate at approximately 10 Hz. Over time, however, clock values output by the sensors may drift, rendering it difficult to correlate captured data from the sensors with respect to time. Synchronizing data from multiple sensors becomes even more complex when sensors with different sampling frequencies are introduced and when sensors that do not produce data at regular intervals are introduced to a sensor system.

One manner for causing data from multiple sensors with different time bases to correspond to a common time base is to use a mechanism that can receive all sensor data in real time and provide timestamps to sensor data as it is received. Devices that can perform such functions, however, are typically relatively expensive. In addition, this would require a particular system architecture, which may not be desirable for certain applications. Furthermore, a consumer level device such as a personal computer may not be able to timestamp sensor data with sufficient accuracy for certain applications of the sensor data. For instance, if data is recorded by software on a personal computer by way of a serial interface, delays on the interface, the personal computer internal architecture, and/or the operating system may occur which can be random and can range as high as two seconds or more. Accordingly, if an error tolerance is below two seconds, such software on the personal computer is insufficient for assigning a common time base to data from multiple sensors.

SUMMARY

The following is a brief summary of subject matter that is described in greater detail herein. This summary is not intended to be limiting as to the scope of the claims.

Described herein are various technologies pertaining to causing data from a plurality of data sources (e.g., sensors) that have different time bases to be correlated with a common time base. A system that includes a plurality of data sources can include a trigger component that can output time data such as a timestamp or similar data. The trigger component can also output a trigger signal that can cause at least one sensor to capture data. The system may further include at least one synchronized data source, wherein the synchronized data source can be synchronized to the trigger component. For instance, the synchronized data source can capture data in response to receipt of a trigger signal from the trigger component. The system may further include at least one unsynchronized data source that captures data pursuant to an internal clock or other mechanism that is independent of the trigger component.

A system timestamp generator component can receive data from the trigger component and synchronized data source and the unsynchronized data source. The system timestamp generator component may provide timestamps to each piece of data received from the trigger component, the synchronized data source and/or the unsynchronized data source. More specifically, the system timestamp generator component can correlate a system timestamp for a timing value or timestamp output by the trigger component and further correlate a system timestamp to data output by the synchronized data source and can still further correlate a system timestamp with data output by the unsynchronized data source.

As noted above, the system timestamp generator component can be included in a consumer level computing device and therefore system timestamps provided by the system timestamp generator component may be relatively imprecise. Accordingly, system timestamps assigned to data output by the unsynchronized data source and data output by the synchronized data source can be modified based at least in part upon the timestamp output by the trigger component and known or determined sampling frequency corresponding to the unsynchronized data source. Once the system timestamps are appropriately adjusted, the correlation between the time base used by the system timestamp generator component and the time base used by the trigger component can be ascertained and data output by the synchronized data source and the unsynchronized data source can be correlated.

Other aspects will be appreciated upon reading and understanding the attached figures and description.

DETAILED DESCRIPTION

Figure 1:
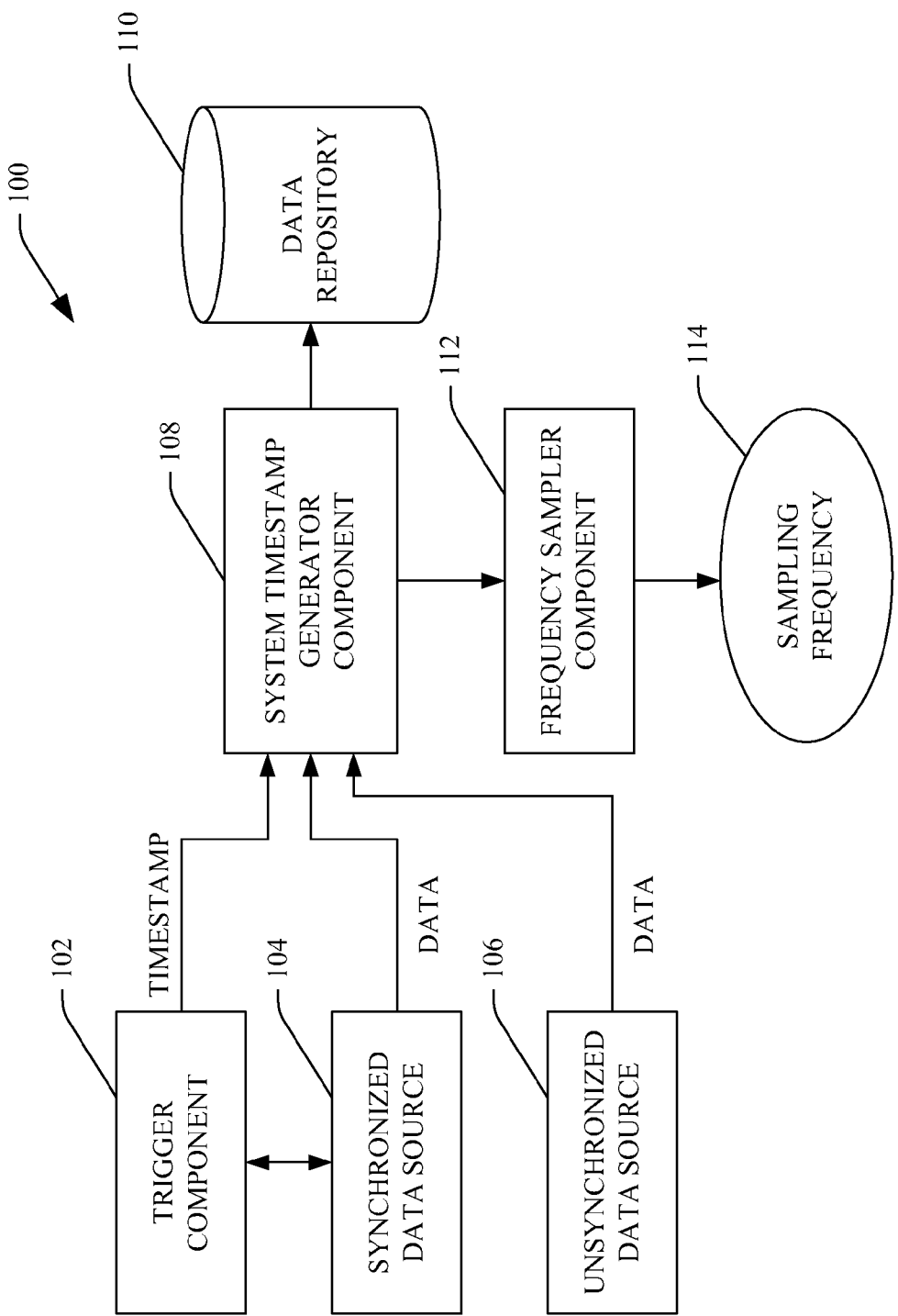
FIG. 1 is a functional block diagram of an example system that facilitates capturing data from synchronized and unsynchronized data sources.

Various technologies pertaining to causing data packets from synchronized and unsynchronized data sources to have a common time base will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates capturing data from synchronized and unsynchronized data sources is illustrated. The system 100 can include a trigger component 102 which can also be referred to herein as a trigger board or trigger module. The trigger component 102 can include a clock that conforms to a first time base, wherein such first time base is desirably used as a common time base for data received from multiple synchronized and unsynchronized data sources. The trigger component 102 can be configured to output trigger signals and/or receive synchronization signals, wherein a trigger signal output by the trigger component 102 can cause a data source to capture data and transmit data to a central module and a synchronization signal can indicate that a data source has captured data and transmitted data to the central module. The trigger component 102 can be configured to output trigger signals periodically (e.g., in accordance with a particular frequency) in response to receipt of particular data from a sensor (e.g., when a particular velocity is reached and/or after a particular distance has been traveled), etc. In addition, the trigger component 102 can output a trigger timestamp for each instance that the trigger component outputs a trigger signal. In another example, the trigger component 102 can be configured to output a trigger timestamp upon receipt of, for instance, a synchronization signal from one or more data sources that are in communication with the trigger component 102.

The system 100 may additionally include at least one synchronized data source 104, wherein the synchronized data source 104 is in direct communication with the trigger component 102. For instance, the synchronized data source 104 can generate a first data packet in response to receipt of a trigger signal output by the trigger component 102. In another example, the synchronized data source 104 can output the first data packet and at a substantially similar time output a synchronization signal that can be received by the trigger component 102, which may then generate a trigger timestamp in response to receiving the synchronization signal from the synchronized data source 104. In either case, for each data packet output by the synchronized data source 104, the trigger component 102 can generate a trigger timestamp. In addition, the synchronized data source 104 may include its own real time clock and the synchronized data source 104 can output a time value pertaining to the real time clock together with the first data packet.

The system 100 can additionally include at least one unsynchronized data source 106, wherein the unsynchronized data source 106 can output a second data packet independent of the trigger component 102 (and therefore independent of a time base used by the trigger component 102). Thus, the unsynchronized data source 106 does not provide a synchronization signal to the trigger component 102 or receive a trigger signal from the trigger component 102. The unsynchronized data source 106 may, for instance, generate data packets at a frequency that is independent of the time base of the trigger component 102, wherein the frequency may be approximate and/or unknown.

The system 100 can further include a system timestamp generator component 108 that can generate timestamps corresponding to a second time base for each timestamp received from the trigger component 102 and for each data packet received from the synchronized data source 104 and the unsynchronized data source 106. Pursuant to an example, timestamps output by the trigger component 102, data packets output by the synchronized data source 104, and data packets output by the unsynchronized data source 106 can be received by way of a serial interface/input of a computing apparatus. The system timestamp generator component 108 can be included in the serial interface or be in communication with the serial interface and can assign system timestamps to triggered timestamps from the trigger component 102. The system timestamp generator component 108 can additionally assign system timestamps to data packets received from the synchronized data source 104 and data packets received from the unsynchronized data source 106. The system timestamps assigned by the system timestamp generator component 108, however, may be subject to delay and/or may otherwise be relatively imprecise.

The system 100 may further include a data repository 110 that can store trigger timestamps and corresponding system timestamps assigned thereto, data packets output by the synchronized data source 104 and system timestamps corresponding thereto, and data packets output by the unsynchronized data source 106 and system timestamps corresponding thereto.

The system 100 may further include a frequency sampler component 112 which can sample data packets output by the synchronized data source 104 and/or unsynchronized data source 106 and determine a sampling frequency 114 corresponding to the synchronized data source 104 and/or the unsynchronized data source 106. For instance, the frequency sampler component 112 can monitor the unsynchronized data source 106 over a particular period of time and can determine a sampling frequency pertaining to the unsynchronized data source 106 based at least in part upon a number of data packets output by the unsynchronized data source 106 over the particular period of time.

In an example, the system 100 may be used in connection with obtaining images and corresponding metadata that can be used to generate a three-dimensional representation of a geographic region. For instance, at least the synchronized data source 104 and the unsynchronized data source 106 can be mounted/fixed to an automobile that travels over one or more streets. In an example, the synchronized data source 104 may be a digital camera that captures digital images of building facades. The digital camera may capture a digital image and at a substantially similar point in time, output a synchronization signal that is received by the trigger component 102, which in turn generates a trigger timestamp corresponding to the captured image. In another example, the trigger component 102 can output a trigger signal that is received by the digital camera, wherein the digital camera can capture an image upon receipt of the trigger signal. At a substantially similar point in time the trigger component 102 can output a trigger timestamp. Still further, the synchronized data source 104 may be a global positioning system receiver or a near infrared camera which can be used to capture near infrared images. Such sensors/systems can operate in conjunction with the trigger component 102 as described above. Furthermore, the unsynchronized data source 106 may be or include a distance measurement instrument and inertial navigation system and/or a velocity sensor. As noted above, these sensors can operate independent of the trigger component 102. Additionally, information captured from these sensors can be used in connection with generating a three-dimensional representation of a geographic region such as a street, a building, a city, etc. Generating such a three-dimensional representation can require data packets output from the synchronized data source 104 and the unsynchronized data source 106 to correspond to a common time base.

Figure 2:
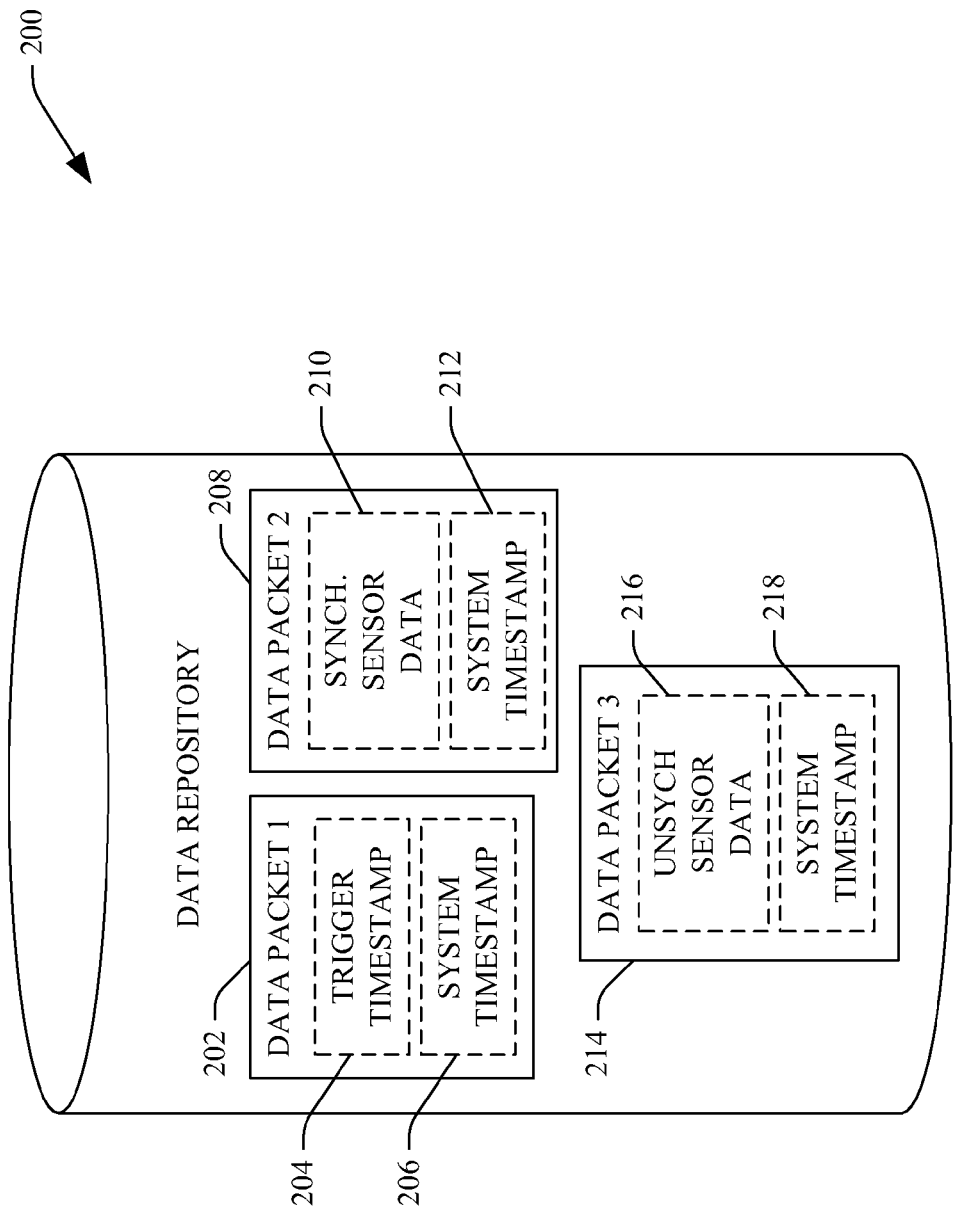
FIG. 2 illustrates an example data repository and example data that may be included in the data repository.

Referring now to FIG. 2, an example data repository 200 that includes a plurality of data packets is illustrated. More particularly, the data repository 200 includes a first data packet 202 that comprises a trigger timestamp 204 generated by the trigger component 102 (FIG. 1) and a system timestamp 206 that corresponds to the trigger timestamp 204, wherein the system timestamp 206 was generated by the system timestamp generator component 108 in response to receipt of the trigger timestamp 204.

The data repository 200 is further shown to include a second data packet 208, wherein the second data packet includes synchronized sensor data 210 output by the synchronized data source 104 and a corresponding system timestamp 212 generated by the system timestamp generator component 108 upon receipt of the synchronized sensor data 210. The data repository 200 may further include a third data packet 214 which includes unsynchronized sensor data 216 output from the unsynchronized data source 106 and a corresponding system timestamp 218 generated by the system timestamp generator component 108 upon receipt of the unsynchronized sensor data 216. Thus, it can be discerned that data packets output by the trigger component 102, the synchronized to data source 104, and the unsynchronized data source 106 can have a timestamp assigned thereto by the system timestamp generator component 108, and such data packets and corresponding timestamps can be retained in the data repository 200.

Figure 3:
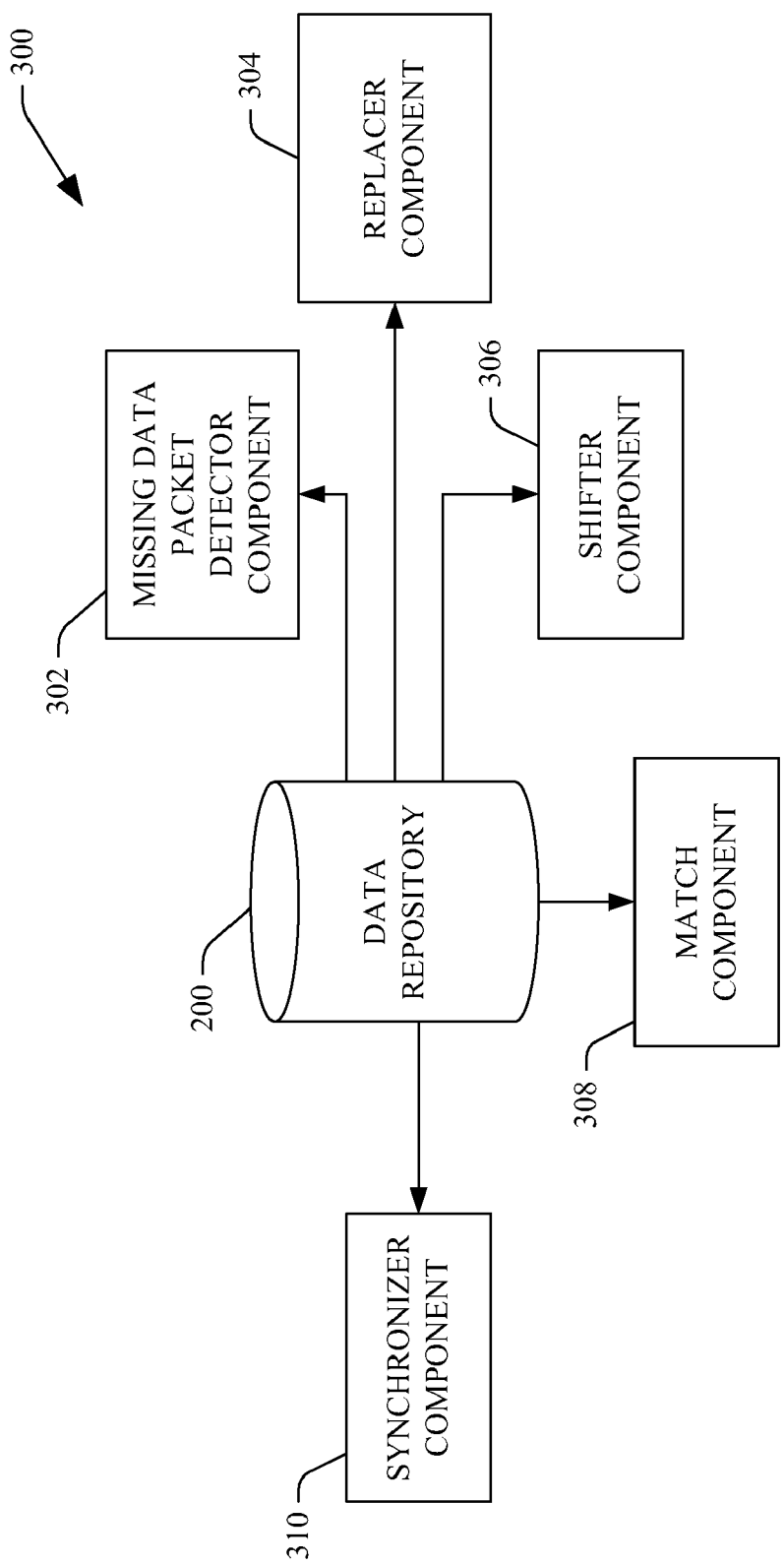
FIG. 3 is a functional block diagram of an example system that facilitates causing data from synchronized and unsynchronized data sources to have a substantially similar time base.

Referring now to FIG. 3, an example system 300 that facilitates causing data from synchronized data sources and unsynchronized data sources to have a common time base is illustrated. The system 300 includes the data repository 200 which can include data packets similar to those shown in FIG. 2. The system 300 also includes a missing data packet detector component 302 that can determine whether a trigger timestamp, a data packet from the synchronized data source 104, or a data packet from the unsynchronized data source 106 has been lost during transmission of data packet(s) from the data sources or the trigger component 108. In an example, the missing data packet detector component 302 can analyze counter data in data packets output by the synchronized data source 104. For instance, the synchronized data source can transmit a counter in a serial communication protocol which increments with each data packet transmitted to the system timestamp generator component 108. Thus, the missing data packet detector component 302 can detect missing data packets output by the synchronized data source 104 by analyzing counter values to determine whether the counter values increment monotonously by one. If each counter value is not incremented by one when compared to a previous counter value, the missing data packet detector component 302 can determine that a data packet output by the synchronized data source 104 has been lost. The missing data packet detector component 302 may then generate a data packet to replace the detected missing data packet and can mark such data packet as being invalid.

In another example, the synchronized data source 104 may be configured to output data packets at regular intervals. The missing data packet detector component 302 can determine that a data packet is missing by analyzing trigger timestamps output by the trigger component 102, wherein analysis can include dividing a trigger timestamp difference between data packets output by the synchronized data source 104 by the expected sample frequency.

In another example, the unsynchronized data source 106 may output data packets at a fixed sample frequency. The missing data packet detector component 302 can detect missing data packets, for instance, by analyzing system timestamps corresponding to such data packets. For example, the missing data packet detector component 302 can analyze a difference between system timestamps over a particular set of data packets divided by the expected sample frequency. Again, the missing data packet detector component 302 can generate a data packet to replace the missing data packets and can mark such generated replacement data packets as invalid.

In still yet another example, the trigger component 102 can output timestamps at a fixed sample frequency, for instance. The missing data packet detector component 302 can determine whether any timestamps are missing by dividing a number of timestamps over a particular period of time by the known fixed sample frequency. The missing data packet detector component 302 may then replace the missing timestamp by way of interpolation between two valid timestamps.

With respect to the synchronized data source 104, the missing data packet detector component 302 can ensure that a one-to-one correspondence exists between data packets output by the synchronized data source 104 and timestamps output by the trigger component 102.

The system 300 also includes a replacer component 304 that can modify a system timestamp corresponding to a data packet output by the unsynchronized data source 106 based at least in part upon a known or determined sampling frequency corresponding to the unsynchronized data source 106. More particularly, as noted above, the unsynchronized data source 106 can output data packets to the system timestamp generator component 108 by way of a serial interface. Due to system delays, the system timestamp generator component 108 may assign identical system timestamps to different data packets output by the unsynchronized data source 106. The replacer component 304 can replace multiple equal system timestamps by modifying timestamp values based at least in part upon the known or determined sampling frequency corresponding to the unsynchronized data source 106. The replacer component 304 can also modify system timestamps corresponding to data packets output by the synchronized data source 104 and trigger timestamps output by the trigger component 102. More particularly, the system timestamps can be adjusted by way of interpolation using a known or determined sampling frequency corresponding to the trigger component 102, the synchronized data source 104 and/or the unsynchronized data source 106.

The system 300 may further include a shifter component 306 that can modify system timestamps backwards in time based at least in part upon a known or determined sampling frequency corresponding to the trigger component 102, the synchronized data source 104 and/or the unsynchronized data source 106. As noted above, data packets received by the system timestamp generator component 108 may be assigned timestamps that are not in periodic intervals that correspond to the sampling frequencies of the trigger component 102, the synchronized data source 104 and/or the unsynchronized data source 106. The shifter component 306 can detect such shifts by comparing the system timestamps corresponding to the data packets output by the trigger component 102, the synchronized data source 104 and/or the unsynchronized data source 106 by comparing such system timestamps with a known or determined sampling frequency or a corresponding trigger timestamp. Once a shift is detected, the shifter component 306 can modify the system timestamps backwards in time to correct such shift.

The system 300 may also include a match component 308 that can match start times of the trigger component 102, the synchronized data source 104 and the unsynchronized data source 106. For instance, these data sources may begin transmitting data at different times, and the match component 308 can be configured to determine from what point (with respect to system timestamps) data is present from all data sources. The match component 308 can be configured to act each time the system 100 (FIG. 1) begins collecting data. The match component 308 can determine a system timestamp for a first data entry for each data source (e.g., the trigger component 102, the synchronized data source 104 and the unsynchronized data source 106). Once such timestamps are determined, the system timestamp with the highest value (e.g., the timestamp that was generated last in time) can be selected by the match component 308. The system timestamp selected by the match component 308 may then be used to locate data packets from other data sources that have substantially similar system timestamps. Data packets of data sources that have timestamps with values lower than the value of the selected timestamps can be removed. The match component 308 can operate in a similar fashion when recording of data has ceased. For instance, the trigger component 102, the synchronized data source 104 and the unsynchronized data store 106 may cease recording at different points in time. In such a case, the match component 308 can locate the system timestamp with the smallest value with respect to last data packets output from all data sources, and can use such smallest value as a threshold. The match component 308 can remove system timestamps with values greater than the value of the located timestamp as well as data packets corresponding thereto.

The system 300 may further includes a synchronizer component 310 that can cause data from each of the data sources (e.g., the trigger component 102, the synchronized data source 104 and the unsynchronized data source 106) to be assigned timestamps with a common time base. For instance, the synchronizer component 310 can assign trigger timestamps to data packets output by the synchronized data source 104 through use of the one-to-one correspondence between trigger timestamps output by the trigger component 102 and data packets output by the synchronized data source 104. Furthermore, as noted above, each trigger timestamp can be assigned a system timestamp (that may have been modified by the missing data set detector component 302, the replacer component 304 and/or the shifter component 306). Thus the synchronizer component 310 can determine a general correspondence between the time base corresponding to the trigger timestamps and the time base corresponding to the system timestamps. Thus, the synchronizer component 310 can assign timestamps corresponding to the time base used by the trigger component 108 to data packets from the unsynchronized data source 106 by using the known correspondence between time bases by way of, for instance, interpolation. If there is too great of a gap between system timestamps corresponding to unsynchronized data packets, the synchronizer component 310 can mark such data packets as invalid.

Figure 4:
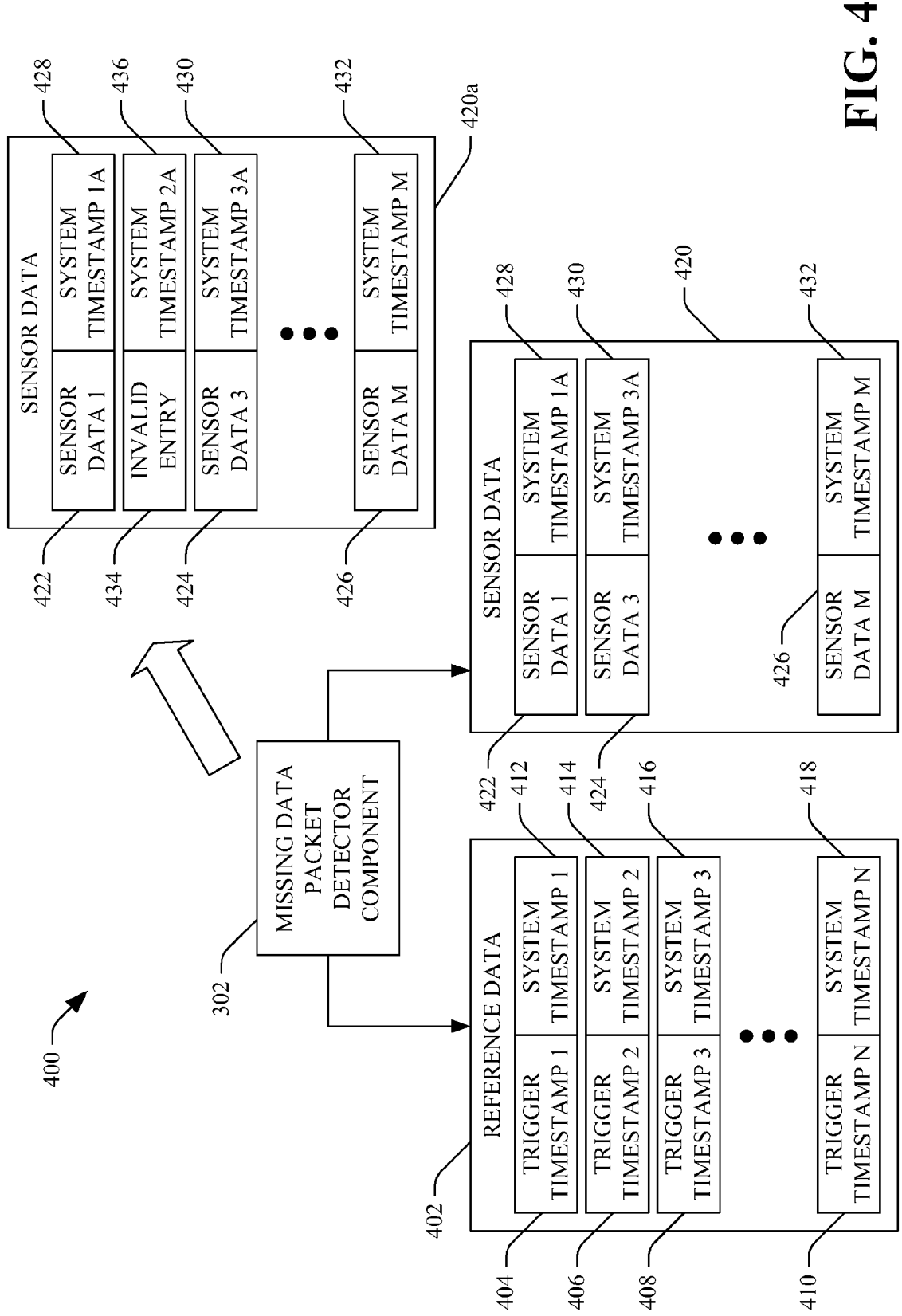
FIG. 4 illustrates an example component that facilitates detecting missing data packets from a synchronized data source.

Referring now to FIG. 4, an example depiction 400 of operation of the missing data packet detector component 302 is illustrated. In this example, a data packet from a synchronized data source has been lost. It is to be understood, however, that the missing data packet detector component 302 can also detect missing timestamps output by the trigger component 102 and/or missing data sets output from the unsynchronized data source 106.

As shown, the missing data packet detector component 302 can have access to reference time data 402, which can include a plurality of trigger timestamps 404-410 that were output by the trigger component 102 and a corresponding plurality of system timestamps 412-418 that were output by the system timestamp generator component 108 upon receipt of the trigger timestamps 404-410. The missing data packet detector component 302 can also have access to sensor data 420, which can include a plurality of data packets 422-426 output by the synchronized data source 104 and a corresponding plurality of system timestamps 428-432 that were assigned to the plurality of data packets 422-426 by the system timestamp generator component 108. As can be discerned by reviewing the sensor data 420, a data packet between the data packet 422 and the data packet 424, has been lost.

The missing data packet detector component 302 can determine that a data packet is missing in the sensor data 420 by way of any one of a plurality of different mechanisms. For instance, each data packet 422-426 in the sensor data 420 can have a counter value that is incremented by one each time that the synchronized data source 104 outputs a data packet. Accordingly, the missing data packet detector component 302 can determine that the counter value increments by more than one between the data packet 422 and the data packet 424. In another example, the missing data packet detector component 302 can, through use of the one-to-one correlation between trigger timestamps and data packets output by the synchronized data source 104, ascertain that a number of trigger timestamps is different from a number of data packets in the sensor data 420. Interpolation may then be used to determine a location of the missing data packet.

The missing data packet detector component 302 may then modify the sensor data 420 to create modified sensor data shown as being 420a. The modified sensor data 420a includes the plurality of data packets 422-426 and the plurality of system timestamps 428-432 that correspond thereto. The missing data packet detector component 302 can also generate an invalid data entry 434 as a replacement for the missing data packet. For instance, the invalid data entry may be marked with all zeros. The missing data packet detector component 302 can additionally generate a corresponding system timestamp 436 which corresponds to the invalid data entry 434. The missing data packet detector component 302 can determine a value for the system timestamp 436 through use of interpolation or by determining which of the trigger timestamps 404 through 410 corresponds to the invalid data entry 434.

Figure 5:
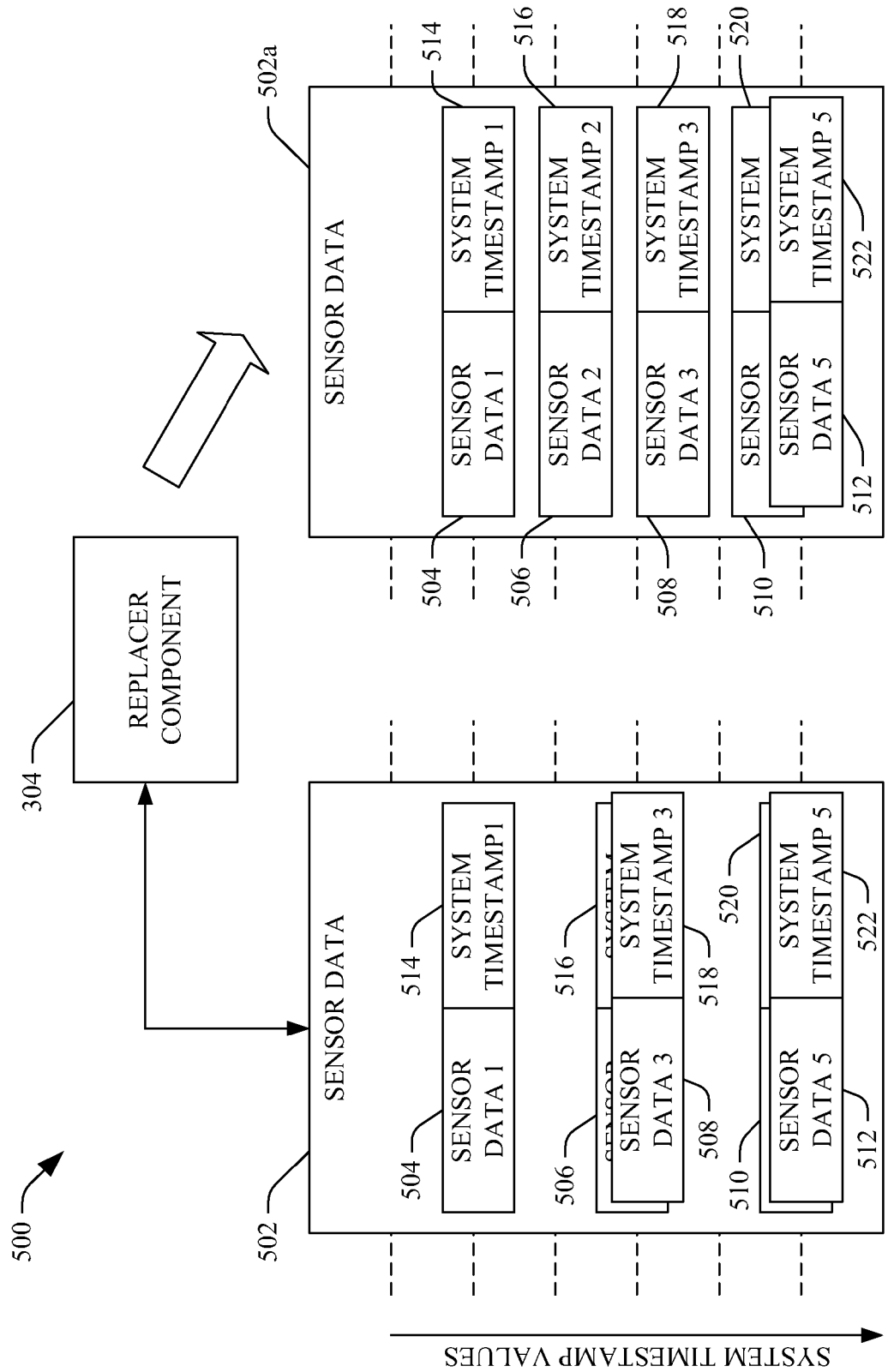
FIG. 5 illustrates an example component that facilitates replacing system timestamps based at least in part upon a known or determined sampling frequency of an unsynchronized data source.

With reference now to FIG. 5, an example depiction 500 of operation of the replacer component 304 is illustrated. As described above, the replacer component 304 can determine that multiple system timestamps have substantially similar values and can modify values of such system timestamps. Furthermore, the replacer component 304 can modify system timestamps corresponding to trigger timestamps, can modify system timestamps corresponding to data packets output by the synchronized data source 104 and/or can modify system timestamps corresponding to data packets output by the unsynchronized data source 106. In the example depicted in FIG. 5, the replacer component 304 can access sensor data 502 which includes a plurality of data packets 504-512 output by the unsynchronized data source 106 and a corresponding plurality of system timestamps 514-522 created by the system timestamp generator component 108 responsive to receipt of the plurality of data packets 504-512.

As shown, the sensor data 502 includes a plurality of system timestamps that have been assigned substantially similar values. This may be caused by delays in an operating system, delays in a serial interface, amongst other delays. More particularly, the system timestamp 516 and the system timestamp 518 have substantially similar values and the system timestamp 520 and the system timestamp 522 also have substantially similar values.

The replacer component 304 can have knowledge of a sampling frequency of the synchronized data source 104 (which output the data packets 504 through 512). For instance, such sampling frequency may be known a priori or the sampling frequency may be determined empirically. Using the known/determined frequency and the values of the system timestamps 514-522, the replacer component 304 can use interpolation between values of timestamps to modify one or more values of the system timestamps 514-522. Thus, as shown, the replacer component 304 can generate modified sensor data 502a, wherein the modified sensor data 502a includes the plurality of data packets 504-512 and the plurality of corresponding system timestamps 514-522. As can be discerned by reviewing the modified sensor data 502a, at least some values of at least some of the system timestamps 514-522 have been altered by the replacer component 304 (e.g., moved backwards in time). It can also be discerned, however, that when the replacer component 304 interpolates new values for at least some of the plurality of system timestamps 514-522, two or more of the system timestamps may have values that are inconsistent with the known sampling frequency of the synchronized data source 104.

Figure 6:
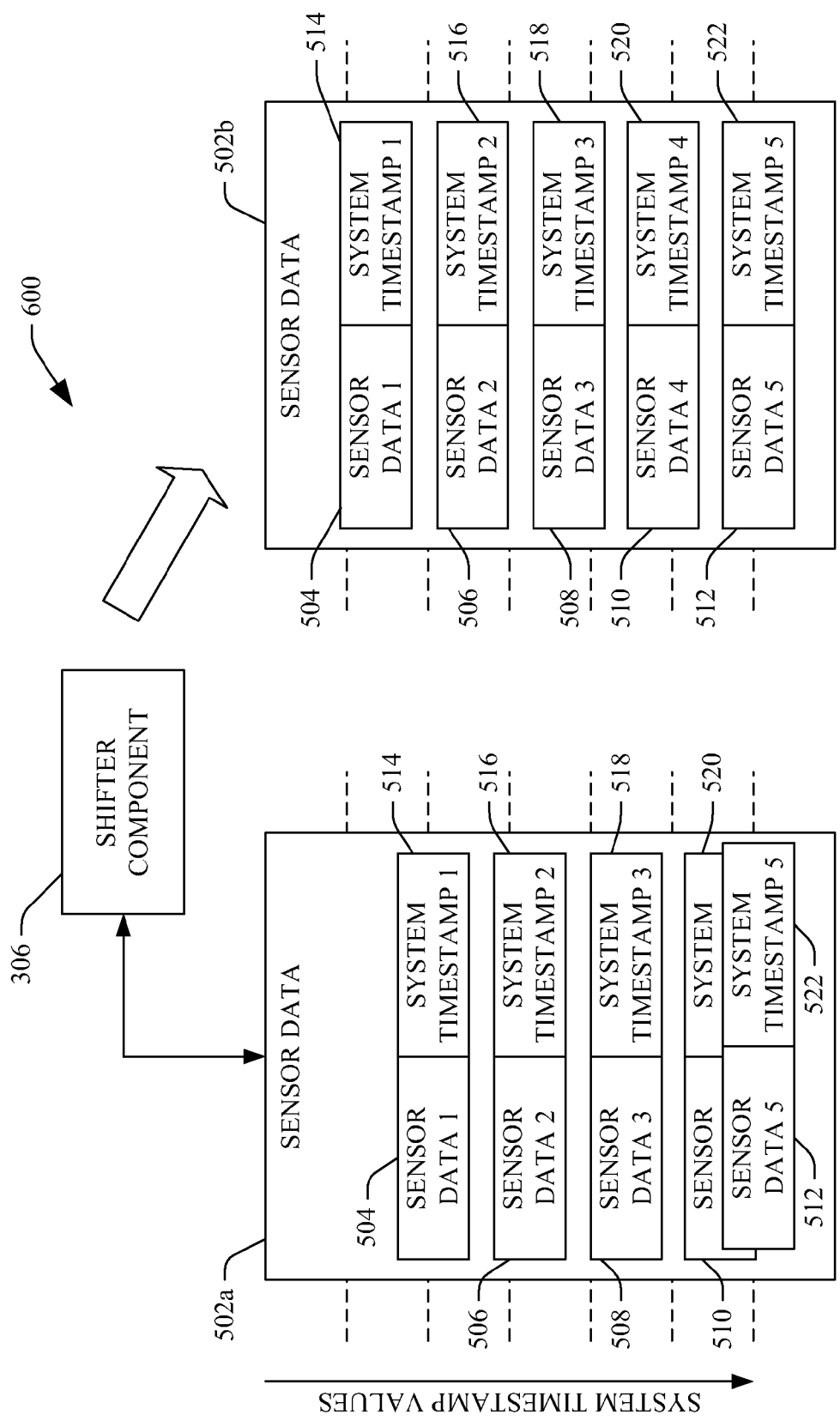
FIG. 6 illustrates an example component that facilitates shifting system timestamps based at least in part upon a known or determined sampling frequency of an unsynchronized data source.

Turning now to FIG. 6, an example depiction 600 of operation of the shifter component 306 is illustrated. Generally, the shifter component 306 can modify values of system timestamps backwards in time such that system timestamp values correspond to a known or determined sampling frequency of a data source that produced the data packets or trigger timestamps (e.g., the trigger component 102, the synchronized data source 104 and/or the unsynchronized data source 106). The shifter component 306 can access the modified sensor data 502a, which includes system timestamps 520 and 522 that have values that are inconsistent with the known or determined sampling frequency of the synchronized data source 104. More specifically, the values of the system timestamps 520 and 522 are too close together when compared to the known or determined sampling frequency of the synchronized data source 104.

The shifter component 306 can modify values of the system timestamps 514-520 such that a difference in value of each of the system timestamps 514-522 is consistent with the known or determined sampling frequency of the synchronized data source 104. In another example, the shifter component 306 can detect improper shifts in time with respect to values of system timestamps by comparing the system timestamps with corresponding trigger timestamps (if the data source is the trigger component 102).

Figure 7:
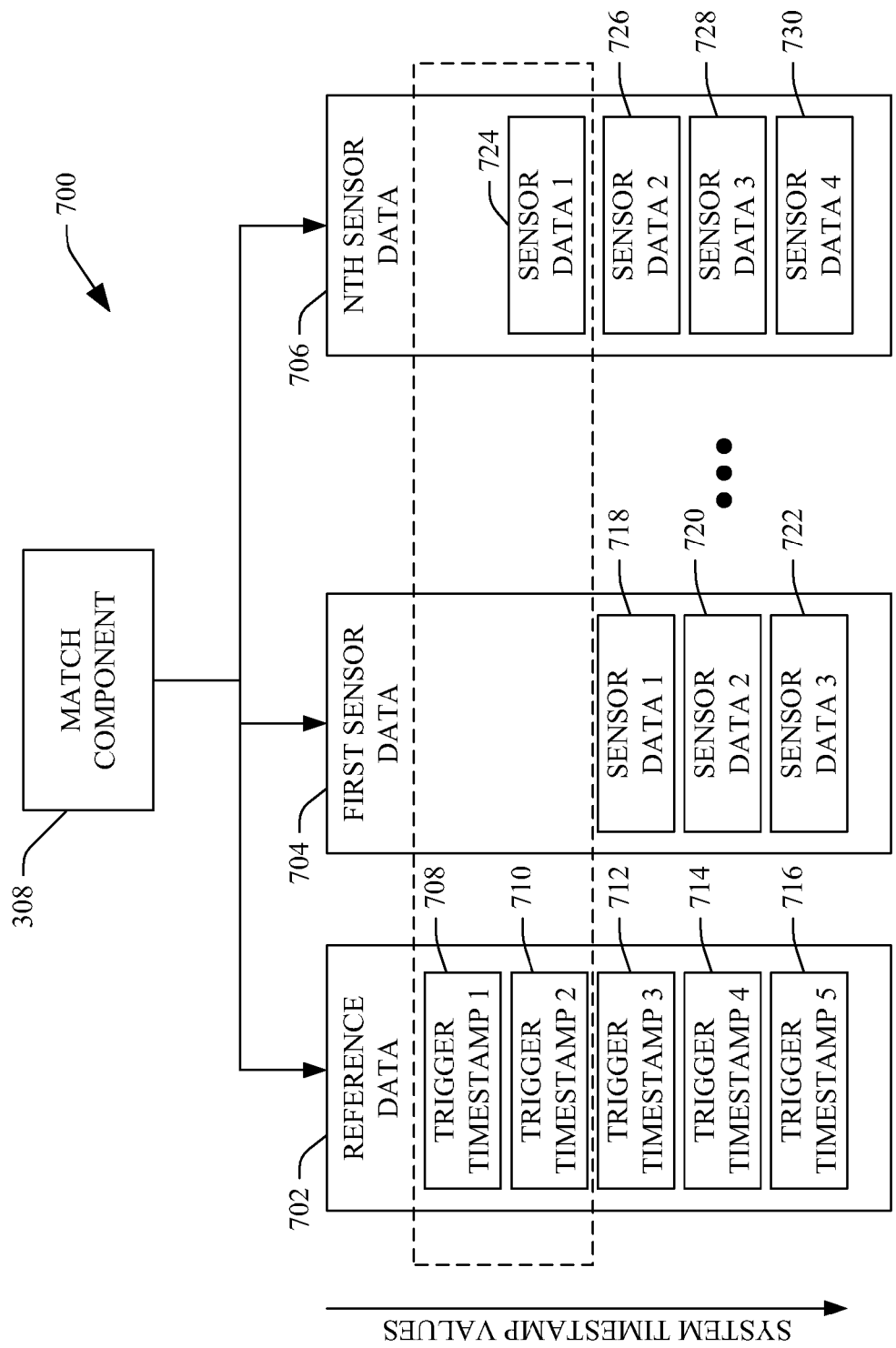
FIG. 7 illustrates an example component that facilitates determining when a plurality of synchronized and unsynchronized sensors have begun collecting data.

Referring now to FIG. 7, an example depiction 700 of operation of the match component 308 is illustrated. As indicated above, data sources by different manufacturers are often not able to be synchronized and thus typically do not output data packets at substantially similar points in time. For instance, the synchronized data source 104 may output data packets several milliseconds before the unsynchronized data source 106 outputs data packets. As indicated above, the system 100 (FIG. 1) can be used in connection with capturing images and corresponding metadata that can be used to generate a three-dimensional representation of a geographic region. Thus, to generate an accurate representation, data from each data source in the system 100 must be present.

The match component 308 may have access to reference data 702, first sensor data 704 and nth sensor data 706. The reference data 702 can include trigger timestamps output by the trigger component 102 and corresponding system timestamps (not shown). The first sensor data 704 may include data packets output by a first data source such as the synchronized data source 104 and corresponding system timestamps (not shown). The nth sensor data 706 can include a plurality of data packets, 724-730 that were output by a data source such as the unsynchronized data source 106 and corresponding system timestamps (not shown).

The match component 308 can access the reference data 702, the first sensor data 704 and the nth sensor data 706 and can determine which of the reference data 702, the first sensor data 704 or the nth sensor data 706 has a first data packet that corresponds to a system timestamp with a value that is greater than values of system timestamps corresponding to first data packets in the other data. As shown in FIG. 7, the match component 308 can determine that the first sensor data 704 includes the sensor data 718 which corresponds to a system timestamp that has a value that is higher than values of the system timestamps corresponding to the first trigger timestamp 708 in the reference data 702 or the sensor data packet 724 in the nth sensor data 706. The match component 308 may then use the value of the system timestamp corresponding to the sensor data 718 to locate data packets in the reference data 702 and the nth sensor data 706 that have system timestamps with values that are similar to the system timestamp corresponding to the sensor data 718. For instance, the match component 308 can determine whether any system timestamps corresponding to the reference data 702 or the nth sensor data 706 are within a threshold range of the value of the system timestamp that corresponds to the sensor data 718. The match component 308 may then remove all data packets in the reference data 702 and the nth sensor data 706 that have system timestamp values that are less than the system timestamp value of the sensor data 718.

The match component 308 can operate in a similar manner when the system 100 stops collecting data. For instance, the match component 308 can locate a smallest value of a system timestamp for each of the data sources in the system 100, can use such timestamp value as a threshold and can remove all data packets from other data sources that have system timestamp values larger than the system timestamp value used as the threshold.

Figure 8:
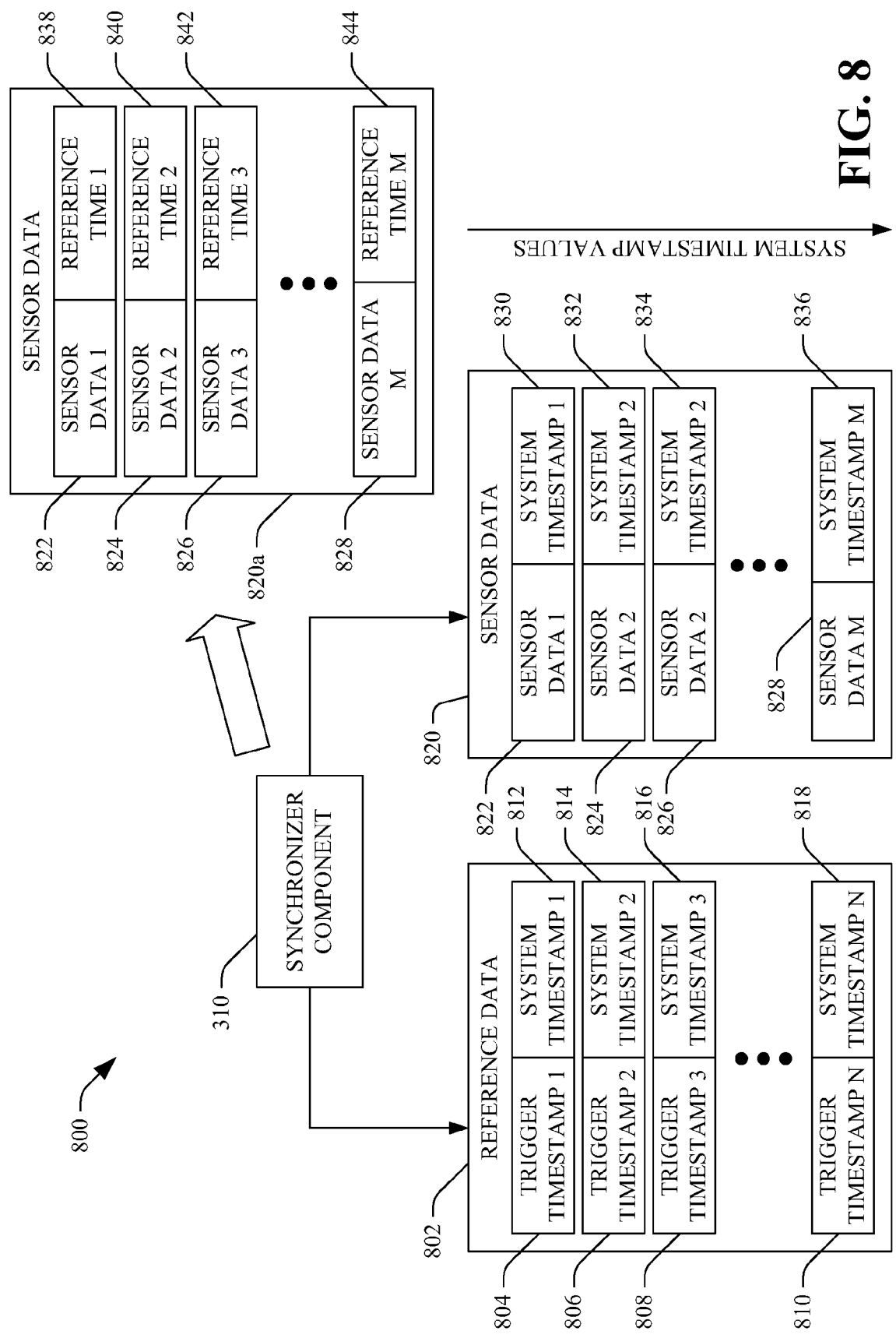
FIG. 8 illustrates an example component that facilitates synchronizing data packets from synchronized and unsynchronized data sources using a common time base.

Referring now to FIG. 8, an example depiction 800 of an operation of the synchronizer component 310 is illustrated. As noted above, the synchronizer component 310 can act to cause data packets from the trigger component 102, the synchronized data source 104, and the unsynchronized data source 106 to have timestamp values that correspond to a common time base (e.g., the time base used by the trigger component 102). For instance, with respect to data output by the synchronized data source 104, the synchronizer component 310 can make use of the one-to-one correspondence between trigger timestamps and data packets output by the synchronized data source 104 to assign the data packets output by the synchronized data source 104 a trigger timestamp output by the trigger component 102. Furthermore, as described previously, each trigger timestamp can be assigned a corresponding system timestamp (that may have been modified by the replacer component 304 or the shifter component 306), and accordingly the synchronizer component 310 can determine a correspondence between time bases of the trigger timestamps and the system timestamps. Therefore, the synchronizer component 310 can translate system timestamp values to timestamp values that correspond to the time base of the trigger component 102 by way of interpolation using the determined correspondence between the time base of the trigger component 102 and the time base corresponding to the system timestamps. If values of adjacent system timestamps corresponding to a data source are too far apart, interpolation may not be used. For instance, if it is determined that values of consecutive timestamps are 4,000 milliseconds apart or greater, interpolation can be used to generate a timestamp that corresponds to the time base of the trigger timestamps. However, corresponding data entries may be marked invalid.

In this example, the synchronizer component 310 can have access to reference data 802, which can include a plurality of trigger timestamps 804-810 and a plurality of corresponding system timestamps 812-818. As described above, values of the system timestamp 812-818 can be modified by, for instance, the replacer component 304 and/or the shifter component 306. Thus, the synchronizer component 310 can determine a correspondence between trigger timestamps 804-810 and system timestamps 812-818.

The synchronizer component 310 may also have access to sensor data 820 which can include data output from the synchronized data source 104 or the unsynchronized data source 106. The sensor data 820 can include a plurality of data packets 822-828 output by the synchronized data source 104 or the unsynchronized data source 106 and can further include corresponding system timestamps 830-836 assigned to the data packets by the system timestamp generator component 108, wherein values of such timestamps may have been altered by the replacer component 304 and/or the shifter component 306. As the synchronizer component 310 can have knowledge of a correspondence between the trigger timestamps 804-810 and the system timestamps 812 to 818, the synchronizer component 310 can determine a correspondence between a time base used by the trigger component 102 and a time base corresponding to the system timestamps. Therefore, the synchronizer component 310 can generate modified sensor data 820a that includes the data packets 822-828 and corresponding reference times 838-844. The reference times 838-844 can correspond to the time base of the trigger timestamps 804-810 and can be determined by the synchronizer component 310 through use of interpolation. Thus, data output by each of the data sources in the system 100 (FIG. 1) can be assigned a timestamp that corresponds to a common base time. Data from different data sources can then be grouped together through use of the referenced timestamps.

Figure 9:
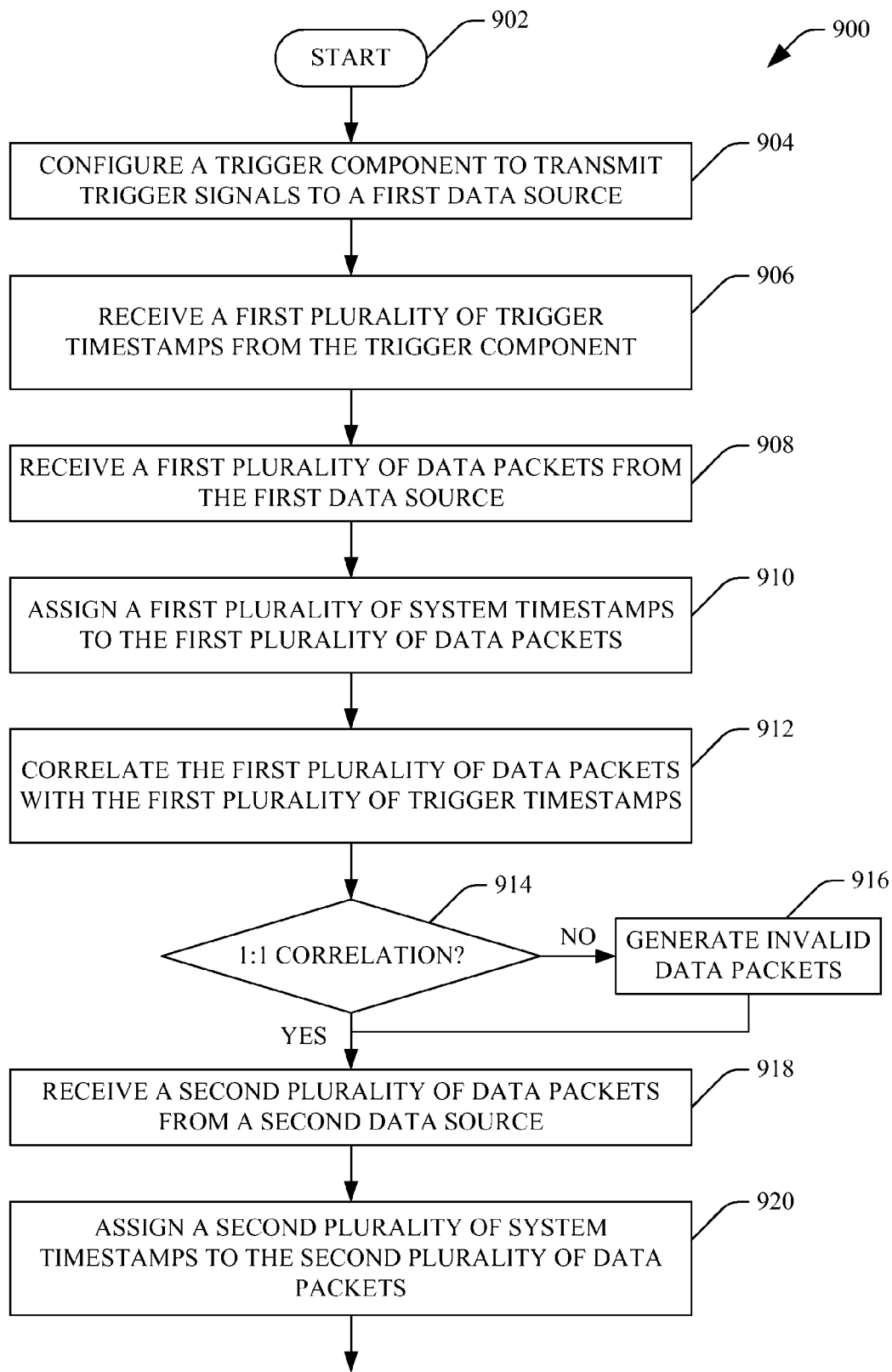
FIGS. 9 and 10 are a flow diagram that illustrates an example methodology for causing data output from synchronized and unsynchronized data sources to have a common time base.
Figure 10:
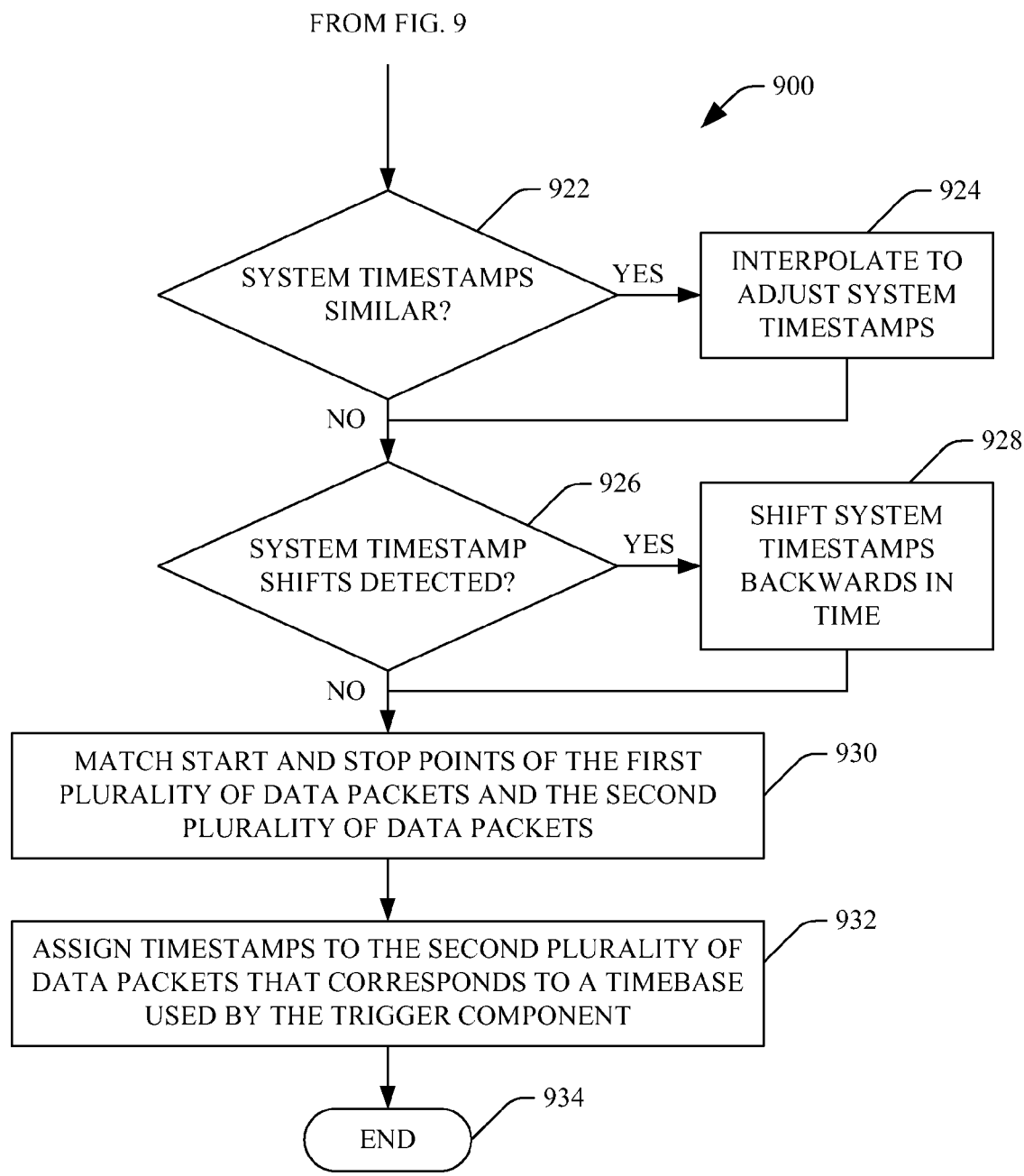

With reference FIGS. 9 and 10, an example methodology is illustrated and described. While the methodology is described as being a series of acts that are performed in a sequence, it is to be understood that the methodology is not limited by the order of the sequence. For instance, some acts may occur in a different order than what is described herein. In addition, an act may occur concurrently with another act. Furthermore, in some instances, not all acts may be required to implement the methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIGS. 9 and 10, a methodology 900 that facilitates assigning timestamps with a common base time to data output from a plurality of synchronized and unsynchronized data sources is illustrated. The methodology 900 begins at 902, and at 904 a trigger component is configured to transmit trigger signals to a first data source. For instance, the first data source may capture data in response to receiving the trigger signals from the trigger components. In another example, rather than the trigger component transmitting trigger signals that causes the first data source to capture data, the first data source can generate synchronization signals that are received by the trigger component, wherein transmittal of a synchronization signal indicates that the first data source has captured data. As noted above, the first data source can be a digital camera, for instance.

At 906, a first plurality of trigger timestamps are received from the trigger component. In an example, the trigger component can generate a trigger timestamp each time a synchronized data source reports an event by way of a synchronization signal. The trigger component may include a real time clock or similar time reference and may also be referred to herein as a trigger board. The trigger component can include a microcontroller that controls timing of one or more sensors and can measure timestamps of other synchronized sensors. The plurality of trigger timestamps can be received at a serial interface of a general purpose computer, for instance.

At 908, a first plurality of data packets can be received from the first data source, wherein the first plurality of data packets can correspond to the first plurality of trigger timestamps. In other words, a one-to-one correlation between data packets received from the first data source and trigger timestamps received from the trigger component can desirably exist. Similar to reception of the first plurality of trigger timestamps, the first plurality of data packets from the first data source can be received by way of the serial interface of the general purpose computer.

At 910, a first plurality of system timestamps can be assigned to the first plurality of data packets received from the first data source. As described above, the system timestamps can be generated at the general purpose computer upon receipt by way of the serial interface. However, such system timestamps may be relatively imprecise and may be associated with delays.

At 912, the first plurality of data packets can be correlated with the first plurality of trigger timestamps. Such correlation can be accomplished by analyzing counter values, by counting a number of trigger timestamps and a number of data packets in the first plurality of data packets, or through other means.

At 914, a determination is made regarding whether there is a one-to-one correlation between the first plurality of data packets and the first plurality of trigger timestamps. If there is not a one-to-one correlation, then at 916 invalid data packets are generated. These invalid data packets can be assigned to certain trigger timestamps and/or system timestamps. Generation of the invalid data packets can cause a one-to-one correlation to exist between trigger timestamps and data packets of the first data source.

At 918, a second plurality of data packets are received from a second data source. For instance, the second data source may be an unsynchronized data source that operates independent of the trigger board and therefore independent of the time base that corresponds to the trigger board. The second data source may be a velocity sensor, an inertial navigation system, a distance measurement unit, or other suitable data source that can operate independently of the trigger component. The second plurality of data packets can be received by way of the serial interface of the general purpose computer, for example.

At 920, a second plurality of system timestamps can be assigned to the second plurality of data packets. For instance, these system timestamps can be assigned by software on the general purpose computer upon receipt by way of the serial interface. As noted above, these system timestamps may be relatively imprecise.

Referring now to FIG. 10, the methodology 900 continues at 922, where a determination is made regarding whether any of the system timestamps are substantially similar (e.g., identical). For instance, delays may exist in the serial interface that may cause system timestamps for different data packets to be assigned substantially similar values. Such determination can be made for data output from any of a plurality of data sources including the trigger component, synchronized data sources and/or unsynchronized data sources.

If any two system timestamps are determined to be substantially similar (e.g., identical), the system timestamps can be adjusted by way of interpolation. For instance, a sampling frequency of a data source can be known or empirically determined and system timestamps can be adjusted based at least in part upon the known or determined sampling frequency of the data source.

At 926, a determination is made regarding whether there has been a shift in system timestamp values (e.g., whether or not any system timestamp shifts have been detected). Such shifts can be ascertained by determining that values of system timestamps are too close together when compared with a known or determined sampling frequency. If a system timestamp shift has been detected, values for the system timestamps can be shifted backwards in time such that the values for the system timestamps correspond to the known or determined sampling frequency of the data source that output data corresponding to the system timestamps. Again, such shifting of system timestamp values can be undertaken for system timestamps corresponding to trigger timestamps and/or system timestamps corresponding to another data source such as a synchronized data source or an unsynchronized data source.

The methodology continues at 928, where start and stop points of the first plurality of data packets and the second plurality of data packets are matched. This matching can be accomplished by comparing values of system timestamps corresponding to the first plurality of data packets and the second plurality of data packets. For instance, to match a start point of the first plurality of data packets and the second plurality of data packets, the first data packet in the first plurality of data packets and the second plurality of data packets can be analyzed. More particularly, system timestamps corresponding to the first data packet in the first plurality of data packets and the second plurality of data packets can be analyzed to determine which of the system timestamps has a higher value (e.g., occurred later in time). Once such largest system timestamp of the first data packet in the first plurality of data packets and the second plurality of data packets is ascertained, such timestamp value can be used as a threshold such that data packets that have system timestamp values lower than the threshold timestamp value can be removed. As described above, stop points of the first plurality of data packets and the second plurality of data packets can be matched in a similar manner. For instance, a last data packet in the first plurality of data packets and a last data packet in the second plurality of data packets can be reviewed (e.g., system timestamps corresponding to the last data packets can be reviewed). With respect to these last data packets, the system timestamp value that is the lowest amongst the system timestamps corresponding to the last data packets can be selected and used as a threshold. Data packets that have timestamp values greater than the threshold can be removed.

At 932 timestamps (e.g., reference timestamps) are assigned to the second plurality of data packets, wherein such timestamps correspond to a time base used by the trigger component. Thus, data packets generated by synchronized data sources and unsynchronized data sources can be assigned a relatively accurate timestamp that corresponds to a single common time base. The methodology 900 completes at 934. Thus, the first plurality of trigger timestamps can be compared with the first plurality of system timestamps, and a correlation can be determined between the first time base (the time base that corresponds to the trigger component) and the second time base (the time base that corresponds to the system timestamps) based at least in part upon the comparison. The correlation can be used to assign reference timestamps to the second plurality of data packets.

Figure 11:
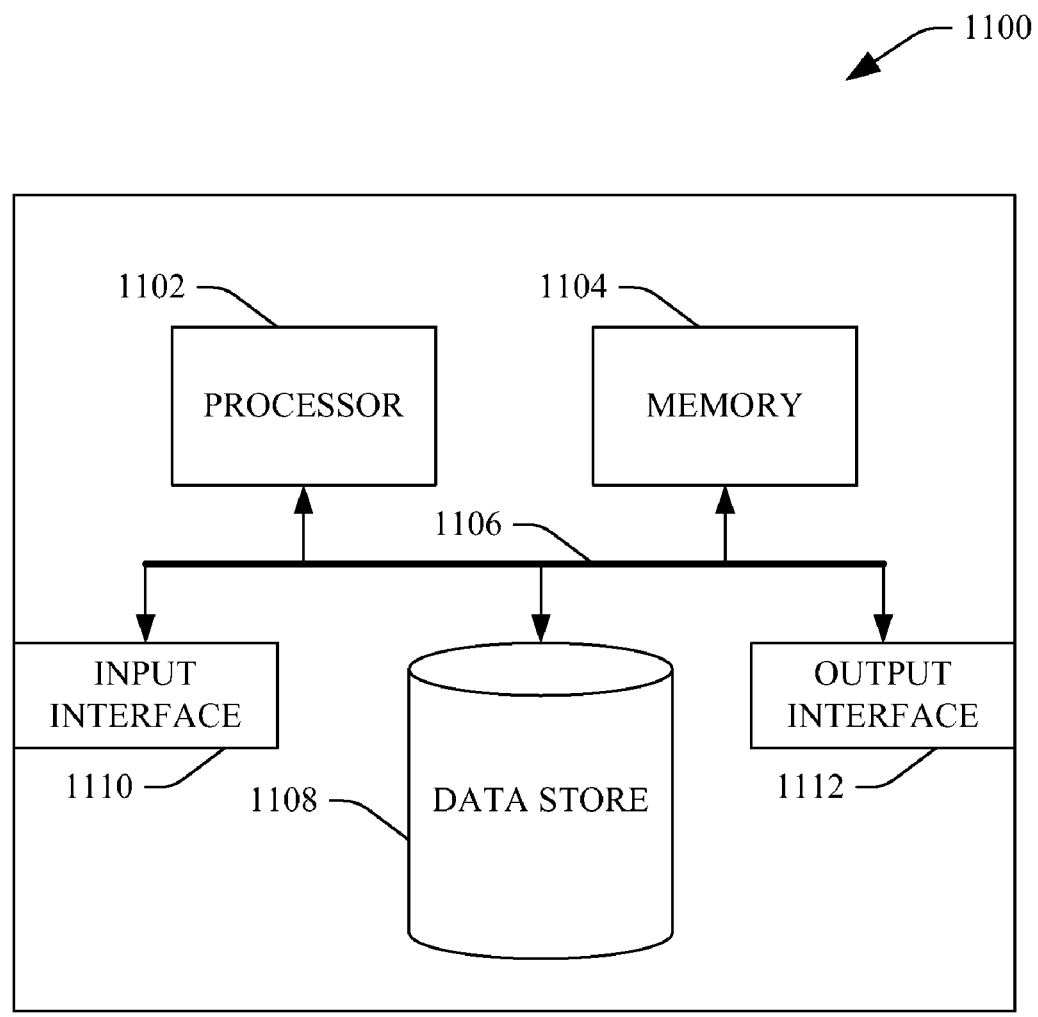
FIG. 11 is an example computing system.

Now referring to FIG. 11, a high-level illustration of an example computing device 1100 that can be used in accordance with the systems and methodologies disclosed herein is illustrated. For instance, the computing device 1100 may be used in a system that supports assigning timestamp values to data packets from asynchronous data sources. In another example, at least a portion of the computing device 1100 may be used in a system that supports generation of a three-dimensional representation of a geographic region such as a building (e.g., assigning digital images to a representation of a building facade). The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store instructions for synchronizing data sources, trigger timestamps, system timestamps, data from a synchronized data source, data from an unsynchronized data source, etc.

The computing device 1100 additionally includes a data store 1108 that is accessible by the processor 1102 by way of the system bus 1106. The data store 1108 may include executable instructions, system timestamps, trigger timestamps, data packets from synchronized and unsynchronized data sources, digital images, etc. The computing device 1100 also includes an input interface 1110 that allows external devices to communicate with the computing device 1100. For instance, the input interface 1110 may be used to receive instructions from an external computer device, trigger timestamps from a trigger board, sensor data from one or more sensors, etc. The computing device 1100 also includes an output interface 1112 that interfaces the computing device 1100 with one or more external devices. For example, the computing device 1100 may display text, images, etc. by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method for causing data from a plurality of data sources to have a common time base, comprising the following computer executable acts:
receiving a first plurality of trigger timestamps from a trigger component, wherein the trigger component generates the first plurality of trigger timestamps using a first time base, wherein the trigger component causes a first data source to capture data, and wherein the trigger component generates a trigger timestamp each time the trigger component causes the first data source to capture data;
assigning a first plurality of system timestamps to the plurality of trigger timestamps, wherein the system timestamps are generated using a second time base that is independent of the first time base, and wherein each trigger timestamp in the plurality of trigger timestamps is assigned a system timestamp;
receiving a first plurality of data packets from a second data source, wherein the second data source is configured to capture data independent of the trigger component and wherein the second data source is one of a distance measurement instrument, an inertial navigation system, or a velocity sensor;
assigning a second plurality of system timestamps to the first plurality of data packets, wherein each data packet in the first plurality of data packets is assigned a system timestamp;
comparing the first plurality of trigger timestamps with the first plurality of system timestamps;
determining a correlation between the first time base and the second time base based at least in part upon the comparison; and
assigning a plurality of timestamps that conform to the first time base to the first plurality of data packets based at least in part upon the determined correlation between the first time base and the second time base.

2. The method of claim 1, further comprising:
receiving a second plurality of data packets from the first data source;
assigning a third plurality of system timestamps to the second plurality of data packets, wherein each data packet in the second plurality of data packets is assigned a system timestamp; and
assigning the first plurality of trigger timestamps to the second plurality of data packets, wherein each data packet in the second plurality of data packets is assigned a trigger timestamp.

3. The method of claim 2, further comprising placing an image of façade of a building on a computer-implemented three-dimensional representation of the building based at least in part upon the first plurality of data packets and the second plurality of data packets.

4. The method of claim 2, further comprising:
determining an earliest timestamp in the second plurality of system timestamps;
determining an earliest timestamp in the third plurality of system timestamps; and
comparing the earliest timestamp in the second plurality of timestamps with the earliest timestamp in the third plurality of timestamps; and
removing at least one data packet from one of the first plurality of data packets or the second plurality of data packets based at least in part upon the comparison.

5. The method of claim 1, further comprising:
determining that a trigger timestamp in the first plurality of trigger timestamps fails to correspond to a data packet in the second plurality of data packets;
generating a data packet to correspond to the trigger timestamp in the first plurality of trigger timestamps; and
marking the data packet as invalid.

6. The method of claim 1, wherein the first data source is a digital camera.

7. The method of claim 6, wherein the first data source and the second data source are fixed to an automobile.

8. The method of claim 1, wherein the second data source captures data packets at a frequency that is independent of the first time base and the second time base, and further comprising:
determining the frequency that the second data source captures data packets; and
adjusting the second plurality of timestamps assigned to the first plurality of data packets based at least in part upon the determined frequency.

9. The method of claim 8, wherein at least some of the second plurality of system timestamps are identical, and wherein adjusting the second plurality of timestamps comprises using interpolation to cause at least some of the plurality of system timestamps to be adjusted to conform to the determined frequency.

10. The method of claim 9, wherein adjusting the second plurality of system timestamps comprises adjusting at least some of the plurality of timestamps backwards in time.

11. The method of claim 1, wherein the first plurality of data packets and the second plurality of data packets are received by way of a serial interface of a computing device.

12. The method of claim 1, wherein the first data source is one of a global positioning system sensor or a near infrared camera.

13. The method of claim 1, further comprising generating a three-dimensional representation of a geographic region based at least in part upon data from the first data source and the second data source.

14. A system that facilitates corresponding synchronized and unsynchronized data to a common time base, comprising:
a synchronized data source that generates a first data packet in response to receipt of a trigger signal;
a trigger component that transmits the trigger signal to the synchronized data source and generates a trigger timestamp using a first time base when the trigger signal is transmitted to the synchronized data source;
an unsynchronized data source that generates a second data packet independent of the trigger component, wherein the unsynchronized data source is one of a distance measurement instrument, an inertial navigation system, or a velocity sensor;
a system timestamp generator component that:
  a) receives the trigger timestamp from the trigger component and assigns a first system timestamp to the trigger timestamp, wherein the first system timestamp corresponds to a second time base that is independent of the first time base; and
  b) receives the second data packet from the unsynchronized data source and assigns a second system timestamp to the second data packet, wherein the second system timestamp corresponds to the second time base; and a synchronizer component that:
  a) compares the trigger timestamp with the first system timestamp; and
  b) assigns a timestamp to the second data packet that conforms to the first time base based at least in part upon the comparison.

15. The system of claim 14, further comprising a frequency sampler component that samples data packets output by the unsynchronized data source and determines an output frequency of the unsynchronized data source.

16. The system of claim 15, further comprising a replacer component that modifies the second system timestamp based at least in part upon the determined output frequency of the unsynchronized data source.

17. The system of claim 16, further comprising a shifter component that further modifies the second system timestamp backwards in time based at least in part upon the determined output frequency of the unsynchronized data source.

18. The system of claim 17, further comprising a match component that compares system timestamps corresponding to data packets output by the synchronized data source and the unsynchronized data source and automatically removes at least one data packet from one of the synchronized data source or the unsynchronized data source based at least in part upon the comparison.

19. The system of claim 14, wherein the synchronized data source is a digital camera, and wherein the synchronized and unsynchronized sources are mounted to an automobile.

20. A computer-readable memory comprising instructions that, when executed by a processor, cause the processor to perform acts comprising:

receiving a first data packet from a first data source, wherein the first data source is a digital camera;

receiving a trigger timestamp that corresponds to the first data packet from an external trigger board, wherein the trigger timestamp corresponds to a first time base, and wherein the trigger board transmits the trigger timestamp in response to causing the first data source to capture the first data packet;

assigning a first system timestamp to the first data packet, wherein the first system timestamp corresponds to a second time base that is independent of the first time base;

correlating the first data packet and the first system timestamp with the trigger timestamp;

receiving a second data packet from a second data source, wherein the second data source transmits the second data packet independent of the trigger board, wherein the second data source is one of a velocity sensor, a distance measurement unit, or an inertial navigation system;

assigning a second system timestamp to the second data packet, wherein the second system timestamp corresponds to the second time base;

performing a comparison between the first system timestamp with the trigger timestamp to determine a correlation between the first time base and the second time base; and changing a value of the second system timestamp to correspond to the first time base based at least in part upon the comparison.

* * * * *